Patented June 10, 1924.

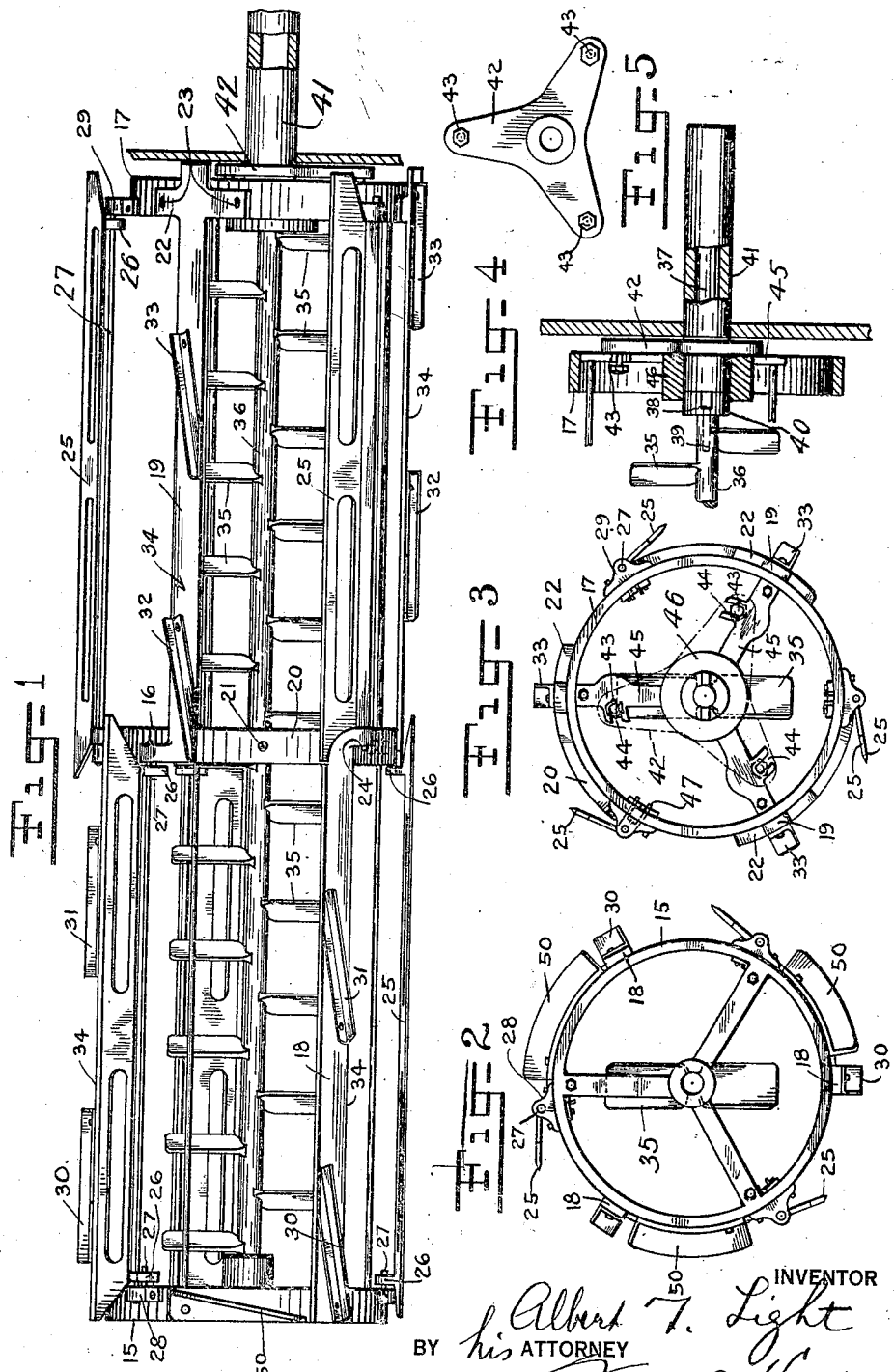

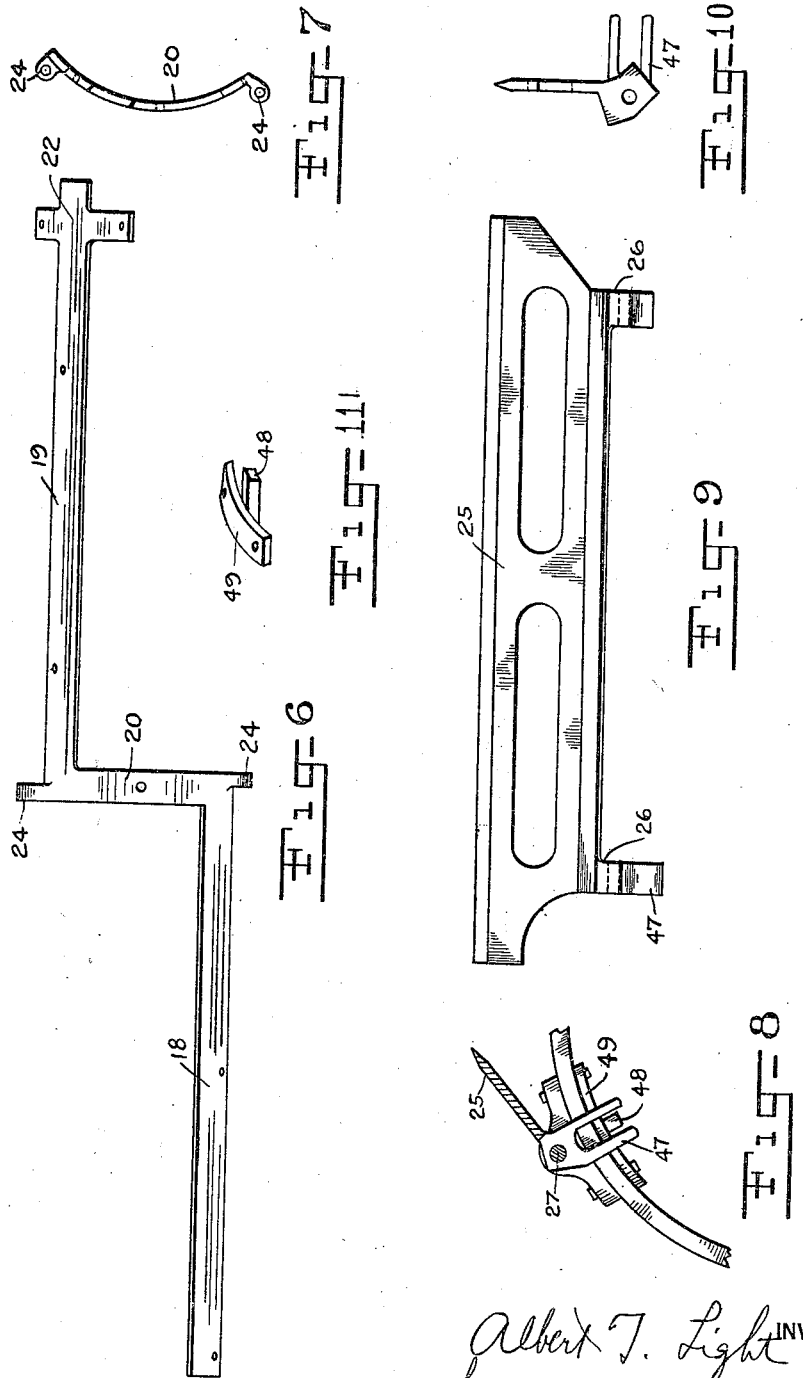

1,497,454

UNITED STATES PATENT OFFICE.

ALBERT T. LIGHT, OF NEW YORK, N. Y.

ICE-CREAM FREEZER.

Application filed April 19, 1921, Serial No. 462,489. Renewed November 12, 1923.

*To all whom it may concern:*

Be it known that I, ALBERT T. LIGHT, a subject of the King of Great Britain and Ireland, residing at New York, in the county of Bronx and State of New York, have invented certain new and useful Improvements in Ice-Cream Freezers, of which the following is a specification.

My invention relates particularly to freezers of the large commercial type, and the objects of the invention are to improve the dasher construction, particularly in the matters of accessibility and the securing of a more complete and uniform agitation and mixture of the cream during the freezing operation.

The invention is especially adapted to a commercial freezer of the type disclosed in my co-pending application, Serial No. 300,293, in which the dasher is of compound construction, involving a series of inner paddle blades rotating in one direction, and an outer series of scraper blades rotating in the reverse direction and substantially in contact with the inner surface of the cream can.

In the accompanying drawings, I have illustrated the dasher of my present invention disassociated from the cream can or freezing vessel, it being understood that the same may be used either with the type of machine illustrated in the application referred to or with any other approved type of machine.

I also wish to have it understood that the present illustration is intended primarily for purposes of disclosure and that various modifications may be made in the structure without departure from the true spirit of the invention as will be evident from the scope of the appended claims.

In the drawings referred to:

Figure 1 is a side elevation of the complete dasher structure coupled with its driving means, a portion of the inner or stationary end wall of the cream can being shown in section.

Figure 2 is an end elevation of the outer end of the dasher.

Figure 3 is a similar view of the inner end of the dasher with the driving spider indicated in dot and dash lines.

Figure 4 is a fragmentary sectional view, showing the coupling elements at the inner end of the dasher.

Figure 5 is a plan view of the triangular driving spider.

Figures 6 and 7 are side and end views respectively of one of the longitudinal frame elements of the dasher cage.

Figure 8 is a fragmentary and part sectional view of one of the scraper blades and its mounting.

Figures 9 and 10 are detached side and end views respectively of one of the movable scraper blades.

Figure 11 is a view of a detail for limiting the oscillation of the scraper.

The cage or frame of the dasher consists of the three rings 15, 16, 17 secured in the spaced relation shown in Figure 1, by longitudinally extending frame bars comprising each the laterally offset bar portions 18, 19 connected by an intermediate rectangularly arranged portion 20. This intermediate connecting portion 20 is curved as appears in the end view, Figure 7, so as to fit over the outer periphery of the intermediate ring 16, where it is secured by means of the screw 21 or other suitable fastenings. At the inner end of the frame the bar element 19 is shown as extended in the form of a T-head 22 which is secured to the inner ring 17 by suitable fastenings, such as those indicated at 23. The outer end of the bar section 18 is suitably fastened to the outer ring 15. In the construction shown, there are three of these compound bar members (Figure 6) spaced equidistantly about the peripheries of the rings.

At the opposite ends of the circumferentially extending connecting portions 20 there are provided perforated ears or lugs 24 which provide bearings for the pivoted scraper blades 25.

The movable scraper blades 25 are shown as having supporting lugs 26 at their opposite ends receiving pivot pins or rods 27. At the intermediate ring these pivot pins or rods 27 are seated in the lugs 24 carried by the connecting portions 20 of the compound frame bars, and at the outer and inner rings the pivot studs 27 are shown as carried by separate brackets 28, 29 secured directly to the peripheral portions of said outer and inner rings respectively.

The longitudinal portions 18, 19 of the frame bars serve as supports for the relatively fixed scraper blades 30, 31, 32, 33. These blades are inclined to direct the cream or other product toward the left in Figure 1, and so toward the outer end of the freezing receptacle. These fixed scraper blades are shown as arranged in pairs and disposed in spaced relation so as to leave spaces 34 between adjacent blades to allow the cream scraped from the wall of the vessel to pass inwardly, where it will be caught by the inner set of reversely rotating paddle blades 35.

The inner set of paddles referred to are carried by a shaft 36 which is detachably coupled to a driving shaft 37 by means of a transverse key 38 (Figure 4) and a bearing pin 39, said bearing pin seating in a bore provided in the inner end of the paddle shaft 26 and the transverse key 38 seating in a collar 40 carried by the end of the paddle shaft 36.

The inner ring member 17 of the dasher is coupled with a tubular drive shaft 41 surrounding the first drive shaft 37 by means of a three armed spider 42 carrying headed studs 43 engaging in slots 44 formed in the radial arms 45 which connect the ring 17 with its hub portion 46.

In coupling the parts described to the driving shafts, the dasher is inserted in the freezing can so as to bring the hub 46 of the frame over the end of the tubular drive shaft 41 and the end of the paddle shaft 36 over the guide stud 39, and the parts are then turned, if necessary, so as to bring the key slots 40 in the hub of the paddle shaft over the drive key 38 and so as to carry the slots 44 in the radial arms 45 over the shanks of the headed driving studs 43. The spider rotates in a direction to carry the driving studs 43 into the closed ends of the slots 44 so that, as a matter of fact, it is simply necessary to insert the dasher far enough into the can to bring the slots into register with the driving studs, for when once the machine is started in this relation, the studs will pass into said slots and remain seated therein so long as power is applied. The paddles are rotated in the reverse direction from the scraper blades so as to agitate the mixture as the interior of the can and force the same out into contact with the wall of the freezer.

The relatively fixed scrapers, 30, 31, 32, 33 are preferably offset longitudinally of the frame so that the spaces 34 between one pair of blades will be in line or substantially in line with one of the blades of a succeeding pair, so that the entire surface of the can will be subjected to the scraping influence of these blades. The ends of the pivoted scraper blades 25 are also shown as standing in overlapping relation for this same purpose.

The outward swinging movement of the pivoted blades 25 is shown as limited and controlled by forks 47 (Figure 8) dependent from the pivot lugs of the blades and fitting over stop pins 48 carried by brackets 49 secured to the ring members of the frame.

The construction disclosed provides a rigid but relatively simple and inexpensive frame adapted to properly support the several sets of fixed and pivoted scraper blades. The dasher structure as a whole is readily engageable with and disengageable from the driving means provided therefor, which, will be realized, is a feature of great importance when the necessity for keeping these parts clean and sanitary is considered.

In the operation of the dasher, the inner set of paddle blades agitate and distribute the mixture at the center of the can, the pivoted blades scrape the mixture as it is frozen from the inner surface of the freezer, and the intermediate relatively fixed blades scrape the frozen mixture from the freezing wall and divert it both inwardly and toward the outer end of the freezer to the point where it is discharged.

By reason of the fact that the longitudinal bar sections are in offset relation, the scrapers or discharging blades do not have to carry around a load of cream the full length of the cylinder. Thus, strain is relieved from the median part of the scraper, and scrapers and side bars are not so likely to bend under pressure.

To assist in this latter function, I have shown the outer ring of the frame as provided with inclined or spirally extending scraper blades 50 disposed in the spaces between the pivoted and fixed blades, and arranged to force the frozen mixture endwise toward the discharge chute at the outer end of the receptacle. These insure that the mixture, as fast as it is properly frozen, will be delivered uniformly to the discharge chute.

What I claim is:

1. A dasher structure for ice cream freezers, comprising supporting rings and frame bars connecting the same in longitudnally spaced relation and consisting each of longitudinal bar sections standing in offset relation and connected at an intermediate point by a transversely extending portion.

2. A dasher structure for ice cream freezers, comprising supporting rings and frame bars connecting the same in longitudinally spaced relation and consisting each of longitudinal bar sections standing in offset relation and connected at an intermediate point by a transversely extending portion, said transversely extending connecting portion being curved to fit one of the ring members and the outer ends of the bar sections being secured to other ring members.

3. A dasher structure for ice cream freezers, comprising supporting rings, frame bars connecting the same in longitudinally spaced relation and consisting each of longitudinal bar sections standing in offset relation and connected at an intermediate point by a transversely extending portion, pivoted scrapers and bearings for said scrapers carried at the opposite ends of each of the intermediate connecting portions aforesaid.

4. A dasher structure for ice cream freezers, comprising supporting rings, frame bars connecting the same in longitudinally spaced relation and consisting each of longitudinal bar sections standing in offset relation and connected at an intermediate point by a transversely extending portion, pivoted scrapers and bearings for said scrapers carried at the opposite ends of each of the intermediate connecting portions aforesaid, and relatively fixed scrapers carried by the offset bar sections aforesaid.

5. A dasher structure for ice cream freezers, comprising supporting rings, frame bars connecting the same in longitudinally spaced relation and consisting each of longitudinal bar sections standing in offset relation and connected at an intermediate point by a transversely extending portion, pivoted scrapers and bearings for said scrapers carried at the opposite ends of each of the intermediate connecting portions aforesaid, relatively fixed scrapers carried by the offset bar sections aforesaid, and substantially spirally disposed scrapers carried by one of the end rings of the frame.

6. A dasher structure for ice cream freezers, comprising supporting rings, frame bars connecting the same in longitudinally spaced relation and consisting each of longitudinal bar sections standing in offset relation and connected at an intermediate point by a transversely extending portion, pivoted scrapers and bearings for said scrapers carried at the opposite ends of each of the intermediate connecting portions aforesaid, and means for limiting the swinging movements of the pivoted scrapers, comprising stop pins carried by the frame, and forks on the scrapers engaging over said stop pins.

7. A dasher structure for ice cream freezers, comprising supporting rings and frame bars connecting the same in longitudinally spaced relation and consisting each of longitudinal bar sections standing in offset relation and connected at an intermediate point by a transversely extending portion, scrapers carried by said frame, radial arms at one end of the frame having slots therein, and a driving spider having headed studs positioned to engage in said slots.

In testimony whereof I affix my signature.

ALBERT T. LIGHT.